US006901425B1

(12) United States Patent
Dykes et al.

(10) Patent No.: US 6,901,425 B1
(45) Date of Patent: May 31, 2005

(54) COMPUTER APPARATUS AND METHOD INCLUDING A DISCONNECT MECHANISM FOR COMMUNICATING BETWEEN SOFTWARE APPLICATIONS AND COMPUTERS ON THE WORLD-WIDE WEB

(75) Inventors: Pernell James Dykes, Byron, MN (US); Jeffrey Edward Selden, Jacksonville Beach, FL (US); Diane Elaine Olson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/772,738

(22) Filed: Dec. 23, 1996

(51) Int. Cl.$^7$ ............................................. G06F 15/16
(52) U.S. Cl. ..................................... 709/203; 709/219
(58) Field of Search ............. 707/10, 3, 4; 395/200.33, 395/200.48, 200.49, 200.56; 709/203, 218, 217, 226

(56) References Cited

U.S. PATENT DOCUMENTS

| | | | | |
|---|---|---|---|---|
| 5,329,619 A | * | 7/1994 | Page et al. | 395/200.33 |
| 5,442,771 A | * | 8/1995 | Filepp et al. | 395/200.49 |
| 5,689,697 A | * | 11/1997 | Edwards et al. | 707/3 |

(Continued)

FOREIGN PATENT DOCUMENTS

JP          5324526 A  * 12/1993

OTHER PUBLICATIONS

Gralle, P., "How Internet Work," Ziff–Davis Press, Emeryville, CA, pp. xi–xiii, pp. 32–37, Nov. 1996.*
Computer Dictionary, 2nd ed., Microsoft Press, pp. 363, 378, 1994.*
Webster's II New College Dictionary, Houghton Mifflin Co., p. 247, 1995.*
Translation of Japanese Kokai Patent Application No. Hei 5[1993]–324526, pp. 1–23, Dec. 1993.*
"Website API 1.1 SDK Introduction and Overview," http://solo.de3.com/wsapi/index.htm, Apr. 13, 1996.
"IBM FlowMark 2.2, Expanding the Capabilities of Object–Oriented Workflow," Marshak, Seybold Group's Workgroup Computing Report, vol. 19, No. 7, 1996.
"The Dependency Manager: A Base Service for Transactional Workflow Management," Gunthor, 1996 IEEE.
"SONET Configuration Management with OpenPM," Du et al., Proceedings of the Twelfth International Conference On Data Engineering, 1996.

(Continued)

*Primary Examiner*—Andrew Caldwell
(74) *Attorney, Agent, or Firm*—Derek P. Martin; Steven W. Roth

(57) ABSTRACT

According to the preferred embodiment, a computer system and method for providing access to a software application from a web browser over the WWW is disclosed. The system includes one or more computers executing a web browser, a web server application, an application gateway, and a software application. The system and method allows a user of the web browser to access the software application. The user inputs data via the web browser, which is communicated to the web server application. The application gateway then generates a conversation identifier to identify this conversation between the web browser and the software application. The application gateway performs the function requested in the web server input data by formatting the appropriate commands with the software application. The operation of the software application can be suspended at any time by calling a disconnect mechanism. The disconnect mechanism directs the application gateway to save the state of the software application such that the software application can be restarted later. This system thus allows complex software application processes that may need to be suspended before completion to be directed from a remote based web browser.

34 Claims, 7 Drawing Sheets

U.S. PATENT DOCUMENTS

| | | | | |
|---|---|---|---|---|
| 5,710,918 A | * | 1/1998 | Lagarde et al. | 707/10 |
| 5,742,845 A | | 4/1998 | Wagner | 710/11 |
| 5,754,772 A | | 5/1998 | Leaf | 709/203 |
| 5,754,774 A | | 5/1998 | Bittinger et al. | 709/203 |
| 5,761,656 A | | 6/1998 | Ben-Shachar | 707/4 |
| 5,761,673 A | | 6/1998 | Bookman et al. | 707/104 |
| 5,778,178 A | | 7/1998 | Arunachalam | 704/203 |
| 5,778,367 A | * | 7/1998 | Wesinger, Jr. et al. | 707/10 |
| 5,781,739 A | * | 7/1998 | Bach et al. | 709/227 |
| 5,784,562 A | * | 7/1998 | Diener | 709/217 |
| 5,787,450 A | | 7/1998 | Diedrich et al. | 707/513 |
| 5,793,964 A | | 8/1998 | Rogers et al. | 709/202 |
| 5,793,972 A | | 8/1998 | Shane | 704/214 |
| 5,802,518 A | | 9/1998 | Karaev et al. | 707/9 |
| 5,826,239 A | | 10/1998 | Du et al. | 705/8 |
| 5,828,840 A | | 10/1998 | Cowan et al. | 709/203 |
| 5,835,724 A | * | 11/1998 | Smith | 709/227 |
| 5,859,971 A | | 1/1999 | Bittinger et al. | 709/203 |
| 5,859,972 A | | 1/1999 | Subramaniam et al. | 709/203 |
| 5,862,327 A | * | 1/1999 | Kwang et al. | 709/203 |
| 5,870,545 A | | 2/1999 | Davis et al. | 709/201 |
| 5,872,915 A | * | 2/1999 | Dykes et al. | 713/202 |
| 5,889,957 A | * | 3/1999 | Ratner et al. | 709/227 |
| 5,892,905 A | * | 4/1999 | Brandt et al. | 713/201 |
| 5,930,512 A | * | 7/1999 | Boden et al. | 717/10 |
| 5,937,388 A | | 8/1999 | Davis et al. | 705/8 |
| 5,961,601 A | * | 10/1999 | Iyengar | 709/229 |
| 6,003,087 A | | 12/1999 | Housel, III et al. | 709/229 |
| 6,014,673 A | | 1/2000 | Davis et al. | 707/202 |
| 6,125,384 A | * | 9/2000 | Brandt et al. | 709/203 |
| 6,144,990 A | * | 11/2000 | Brandt et al. | 709/203 |

OTHER PUBLICATIONS

"Business Process Management with FlowMark," Leymann et al., Compcon Spring 1994, Digest of Papers, 1994 IEEE.

"Standardizing Agent Technology," Sankar et al., StandardView, vol., 3, No. 3, Sep. 1995.

"Policy Resolution for Workflow Management Systems," Jablonski et al., 1995 IEEE.

* cited by examiner

COMPUTER APPARATUS AND METHOD INCLUDING A DISCONNECT MECHANISM FOR COMMUNICATING BETWEEN SOFTWARE APPLICATIONS AND COMPUTERS ON THE WORLD-WIDE WEB

RELATED APPLICATION

This application is related to the following U.S. patent applications: "Computer Apparatus and Method for Communicating Between Software Applications and Computers on the World-Wide Web Using Universal Variable Handling", Ser. No. 08/780,014, filed Dec. 23, 1996, now U.S. Pat. No. 6,144,990; "Computer Apparatus and Method for Providing Security Checking for Software Applications Accessed via the World-Wide Web", Ser. No. 08/772,737, filed Dec. 23, 1996, now U.S. Pat. No. 5,872,915; "Computer Apparatus and Method for Communicating Between Software Applications and Computers on the World-Wide Web", Ser. No. 08/780,013, filed Dec. 23, 1996, now U.S. Pat. No. 6,125,384; and "Computer Apparatus and Method for Providing a Common User Interface for Software Applications Accessed via the World-Wide Web", Ser. No. 08/780,015, filed Dec. 23, 1996, now U.S. Pat. No. 5,892,905.

BACKGROUND OF THE INVENTION

1. Technical Field

This invention generally relates to interactions on the world-wide web, and more specifically relates to an apparatus and method that allows a web user to interact with a software application on another computer system that is accessible via the world-wide web.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful that just a few years ago.

Computer systems typically include operating system software that control the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Other changes in technology have also profoundly affected how we use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate at the same time with a software application running on one computer system.

One significant computer network that has recently become very popular is the Internet. The Internet grew out of the modern proliferation of computers and networks, and has evolved into a sophisticated worldwide network of computer systems linked together by web pages that collectively make up the "world-wide web", or WWW. A user at an individual PC (i.e., workstation) that wishes to access the WWW typically does so using a software application known as a web browser. A web browser makes a connection via the WWW to other computers known as web servers, and receives information from the web servers that is displayed on the user's workstation. Information displayed to the user is typically organized into pages that are constructed using a specialized language called Hypertext Markup Language (HTML).

With the growing popularity of the Internet and the WWW, businesses have recognized that the Internet provides a new way to boost both sales and efficiency. If a user with a web browser can interact directly with a company's application software, the transaction will be simplified. Unfortunately, interaction between the application software running complex processes and a multitude of web browser users can lead to problems. For example, in some cases the web server system will need to be shut down while the software application is in the middle of a complex process. This can occur where maintenance of the server is required, or where conditions cause the system to fail. This can leave the software application in the middle of a process without the ability to restart or finish the process.

Another time this problem can occur is where input is required from a web browser user. For example, a web page may request the users name in an HTML form and require the user to select a particular function using an HTML radio button. These requests are sent to the web browser from the web server. The web user then enters the requested information and resubmits the data back to the web server, which then parses the inputted information from the data stream. Unfortunately, the user may not answer the input request immediately. In fact, it is foreseeable that a user may wait several days before submitting the input or may disconnect without ever completing the transaction. Keeping a process active and waiting for input when the input may be delayed or never provided needlessly uses processing resources of the web server. Additionally, if the process terminates while waiting the process will have to start again at the beginning.

In both these cases the ability to direct and interact with complex software processes remotely through web browsers is severely compromised. Without improved methods of communicating between software applications and computers on the world-wide web, the ability the to use web browsers and the world-wide web as a tool for business is limited.

DISCLOSURE OF INVENTION

According to the present invention, a computer system and method for suspending and restarting a complex software process of a software application to facilitate communication with a web browser over the WWW is disclosed. The system includes one or more computers executing a web browser, a web server application, an application gateway, and a software application. The system and method allows a user of the web browser to access the software application. The user inputs data via the web browser, which is communicated to the web server application. The application gateway then generates a conversation identifier to identify this conversation between the web browser and the software application. The application gateway performs the function requested in the web server input data by formatting the appropriate commands with the software application. The operation of the software application can be suspended at any time by calling a disconnect mechanism. The disconnect mechanism directs the application gateway to save the state of the software application such that the software application can be restarted later. This system thus allows complex software application processes to interact with a remote based web browsers.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention relates to transactions via the WWW. For those individuals who are not Internet or WWW experts, the Overview section below presents many of the concepts that will help to understand the invention.

Overview

Web Transactions

Figure 2:
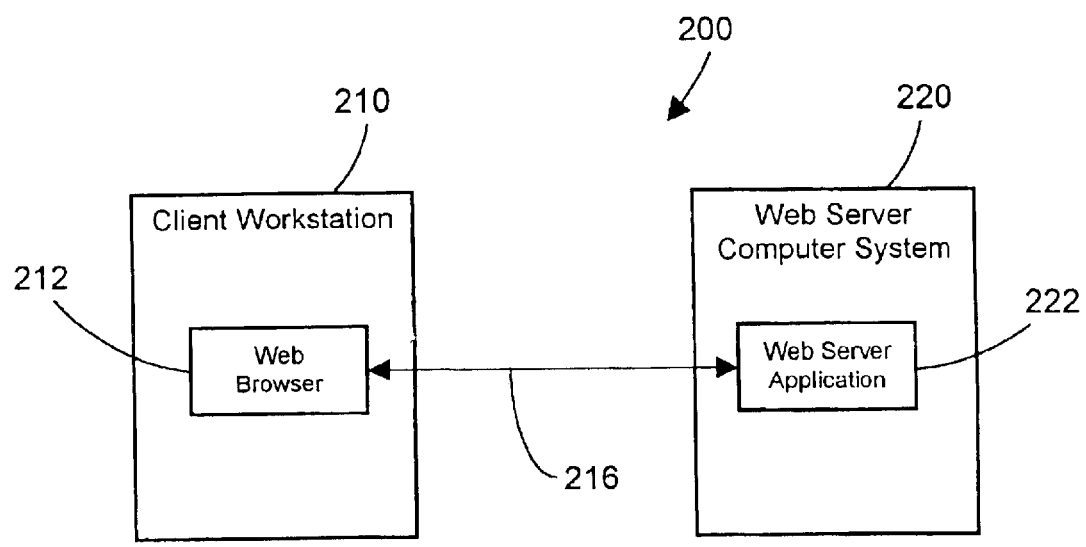
FIG. 2 is a block diagram of a transaction between a client workstation and web server.

Referring to FIG. 2, a typical transaction between a standard web browser 212 running on a client workstation 210 and a web server application 222 running on a web server computer system 220 occurs over a connection 216. Of course, client workstation 210 may be coupled to other computer systems via a local area network (LAN) or via any other type of computer network or other interconnection. Likewise, web server computer system 220 may be coupled to other computer systems as well. Client workstation 210 may be any computer that is capable of providing access to the WWW by using web browser 212. This would include handheld, portable or laptop computers, standard desktop computer systems, dumb terminals connected to a mainframe, etc.

Web browser 212 is a software program running on client workstation 210 that allows a user at client workstation 210 to communicate with other computers over connection 216. Web browser 212 would include any web browser which is capable of transmitting and receiving data over the WWW. This includes commercial software applications such as IBM's WebExplorer, Netscape Navigator, Microsoft Internet Explorer, Apple Computer's CyberDog, and any other software application which now exists or which may be developed in the future for accessing or processing information over the WWW. The preferred embodiment for connection 216 is any suitable connection to the Internet, including a hardwired connection, telephone access via a modem or high-speed TI line, infrared or other wireless communications, computer network communications (whether over a wire or wireless), or any other suitable connection between computers, whether currently known or developed in the future.

It should be noted that client workstation 210 and web server computer system 220 may be the same physical and/or logical computer system. Web browser 212 typically displays pages of hypertext markup language (HTML) data to a user at client workstation 210. Other types of data (besides HTML) may also be transmitted to web browser 212, including text data, graphical data (e.g., graphics image format (GIF) files), audio data (e.g., .WAV files), Java applets (executable code) and a specialized data form known as multipurpose internet mail extensions (data (which may include combinations of the foregoing and other data types).

Web server application 222 is a software program running on web server computer system 220 that allows a user at client workstation 210 to access information controlled by web server 220. One preferred embodiment of web server application 222 in accordance with the present invention is a commercial web server application such as IBM's Internet Connection Server. Other applications are also compatible with the present invention. Web server computer system 220 typically outputs pages of HTML data to WEB browser 212 in response to requests by web browser 212 that reflect action taken by the user at client workstation 210. In addition, as explained above, web server computer system 220 may output other types of data to web browser 212 as well. Output data may include static HTML pages (meaning that the content of the page does not vary), or may include data that must be dynamically determined and inserted into the output data. Web server application 222 may dynamically build output data (e.g., an HTML page) from parts that it retrieves from memory within web server computer system 220 or from other computer systems, or may simply pass through a page that has been constructed at an earlier time or by another computer.

Web browser 212 typically interacts with web server application 222 by transmitting input data over connection 216 to web server computer system 220. This input is typically transmitted using HyperText Transfer Protocol (HTTP) 1.0. Web server computer system 220 running web server application 222 receives the input from web browser 212, and in response, outputs data (e.g., an HTML page) to browser 212. Web server computer system 220 may also have numerous other software components, including Common Gateway Interface (CGI) programs or modules, for performing desired functions. The process described above illustrates a basic transaction over the Internet, recognizing that many details and variations that are within the scope of the present invention are not disclosed herein for the purpose of providing a simple context for understanding the concepts of the present invention.

Web Pages

A web page is primarily visual data that is intended to be displayed on the monitor of client workstation 210. Web pages are generally written in Hypertext Markup Language (HTML). When web server application 222 running on web server computer system 220 receives a web page request, it will build a web page in HTML and send it off across connection 216 to the requesting web browser 212. Web browser 212 understands HTML and interprets it and outputs the web page to the monitor of client workstation 210. This web page displayed on the user's screen may contain text, graphics, and links (which are URL addresses of other web pages.) These other web pages (i.e., those represented by links) may be on the same or on different web servers. The user can retrieve these other web pages by clicking on these links using a mouse or other pointing device. This, entire system of web pages with links to other web pages on other servers across the world collectively comprise the "World-Wide Web" (WWW).

The remainder of this specification discloses how to use the invention to enable communication between a web user at client workstation 210 and a software application via the WWW, particularly in the context of workflow software, A disconnect API is provided that allows a process to disconnect from web server application 222 while awaiting input from a web user, thereby eliminating the overhead in the web server computer system of keeping processes active while awaiting input from a web user that may come a long time after the process is begun, or may never come at all. The disconnect API allows a process to disconnect from web browser and be suspended while awaiting input from the web user. If and when the user supplies the requested data, the process is restarted where it left off and continues processing.

DETAILED DESCRIPTION

Figure 1:
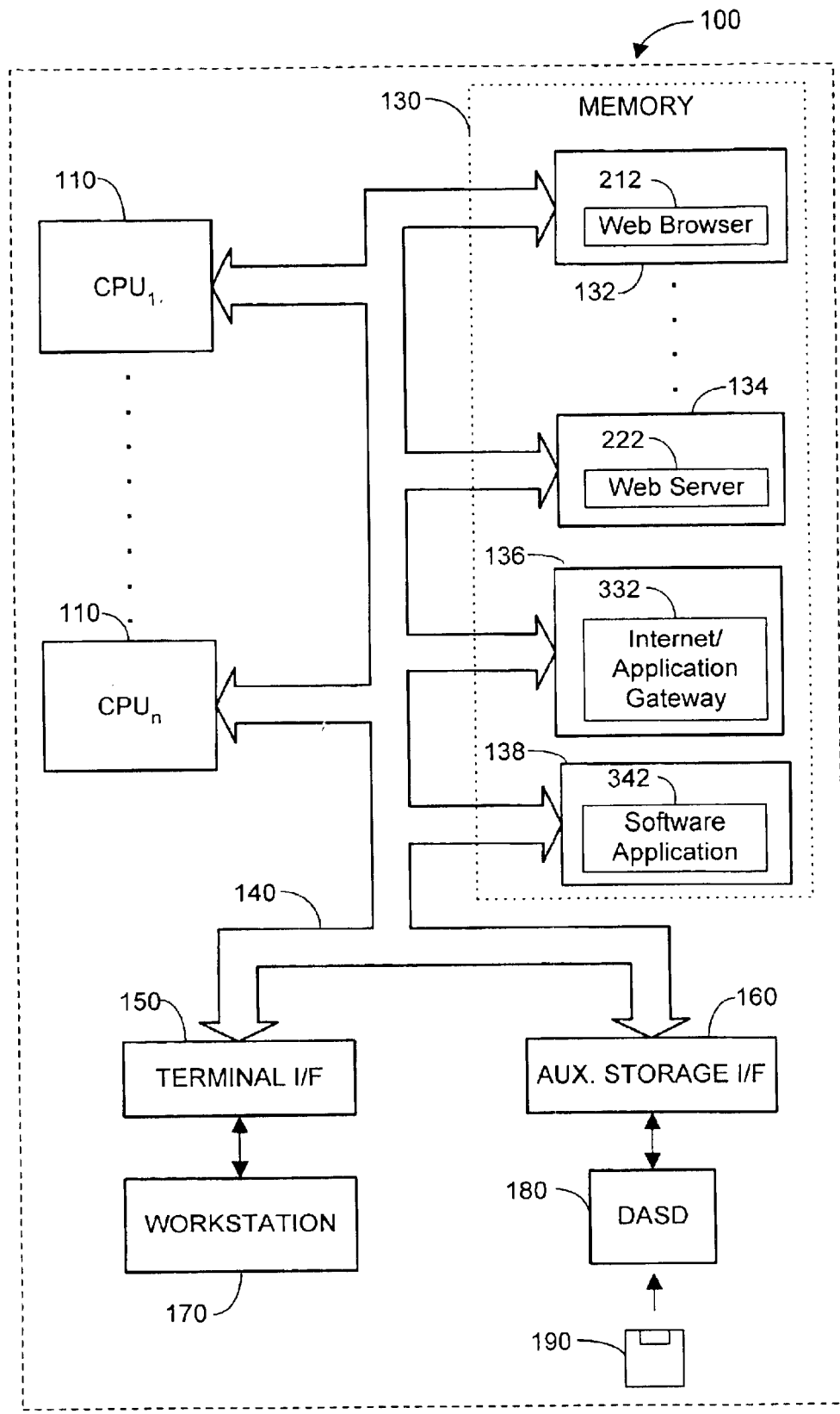
FIG. 1 is a block diagram of a preferred embodiment of the present invention.

Referring now to FIG. 1, a computer system in accordance with a preferred embodiment of the present invention includes: a plurality of Central Processing Units (CPUs) 110; a terminal interface 150; an auxiliary storage interface 160; a workstation 170; a Direct Access Storage Device (DASD) 180; a floppy disk 190; a bus 140; and a memory 130 which includes multiple locations for containing various software programs. In this example, memory 130 includes a web browser 212 running in location 132, a web server application 222 running in location 134, an Internet/application gateway program 332 running in location 136, and a software application 342 running in location 138.

CPUs 110 perform computation and control functions of system 100. All CPUs associated with system 100 may each individually comprise a single integrated circuit, such as a microprocessor, or may comprise any suitable number of integrated circuit devices and/or circuit boards working in cooperation to accomplish the functions of a central processing unit. All CPUs are capable of suitably executing the programs contained within memory 130 and acting in response to those programs or other activities that may occur in system 100.

Memory 130 is any type of memory known to those skilled in the art. This would include Dynamic Random Access Memory (DRAM), Static RAM (SRAM), flash memory, cache memory, etc. While not explicitly shown in FIG. 1, memory 130 may be a single type of memory component or may be composed of many different types of memory components. For example, web browser 212 running in location 132 may be part of system 100's cache memory. In addition, memory 130 and CPUs 110 may be distributed across several different computer that collectively comprise system 100. For example, web browser 212 may reside on one computer with $CPU_1$, web server application 222 may reside on another computer system with a separate $CPU_2$, Internet/application gateway 332 may reside on a third computer system with a different $CPU_{n-1}$ and software application 342 may reside on a fourth computer with a different $CPU_n$. Computer system 00 of FIG. 1 simply illustrates many of the salient features of the invention, without limitation regarding the physical location of CPUs 110 or memory locations within memory 130.

Bus 140 serves to transmit programs, data, status and other forms of information or signals between the various components of system 100. The preferred embodiment for bus 140 is any suitable physical or logical means of connecting computer systems and components known to those skilled in the art. This includes, but is not limited to, direct hard-wired connections, Internet connections, Intranet connections, fiber optics, infrared (IR) and other forms of wireless connections. It is anticipated that many alternative methods and material for connecting computer systems and components will be readily adapted for use with the present invention. This would include those methods and materials not presently known but developed in the future.

Terminal interface 150 allows human users to communicate with system 100, normally through programmable workstation 170. Although system 100 as depicted in FIG. 1 contains only a single workstation 170, it should be understood that the actual number of workstations attached to system 100 will be a function of system design and user preference. Workstation 170 may also be a dumb terminal or other non-programmable computer input/output device which allows human interaction with computer system 100.

Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. As shown in FIG. 1, DASD 180 may be a floppy disk drive which is capable of reading and writing programs or data on floppy disk 190. DASD 180 may also be any other type of DASD known to those skilled in the art. This would include CD-ROM drives, hard disk drives, optical drives, etc. Floppy disk 190 represents a typical 3.5 inch magnetic media disk known to those skilled in the art.

Figure 3:
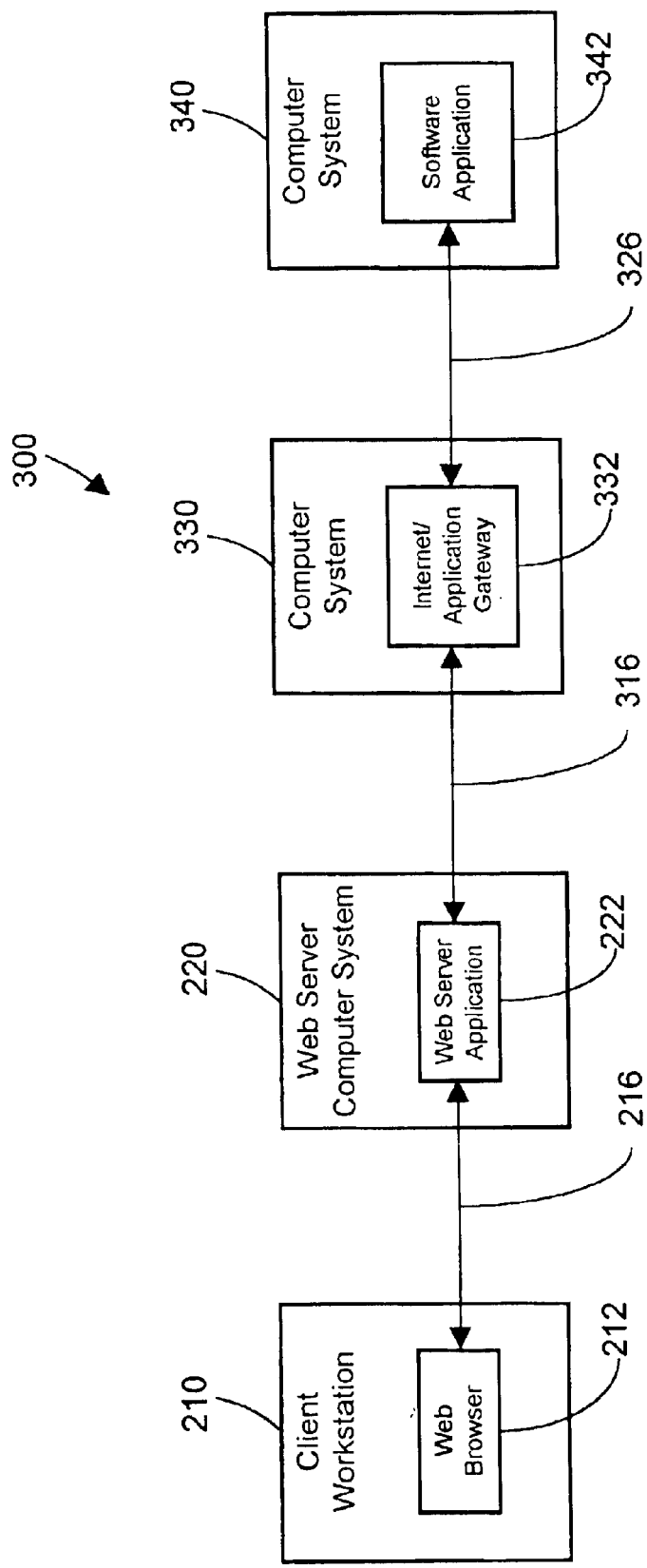
FIG. 3 is a block diagram of a system according to a preferred embodiment of the present invention that allows access to a software application over the World-Wide Web from a standard web browser.

Referring now to FIG. 3, a system 300 for accessing software application 342 via the WWW includes: web browser 212 running on client workstation 210; web server application 222 running on web server computer system 220; connection 216 connecting web browser 212 and web server application 222; an Internet/application gateway 332 running on a computer system 330, a connection 316 connecting web server application 222 and Internet/application gateway 332; a software application 342 running on a computer system 340; and a connection 326 connecting Internet/application gateway 332 and software application 342.

When a user wishes to access software application 342 or retrieve data under the control of software application 342, the user inputs a request from user workstation 210 by providing input to web browser 212. Web browser 212 communicates via connection 216 with web server application 222 which is running on web server computer system 220. While not required, Computer System 330 and Computer System 340 may be the same computer system. Finally, connections 216, 316, and 326 may be any type of physical or logical means of connecting computer systems known in the art. This includes, but is not limited to, direct connections, Internet connection, Intranet connections, Infra Red (IR) and other forms of wireless connections. It is anticipated that many alternative methods and material for connecting computer systems will be readily adapted for use with the present invention. This would include those methods and materials to be developed in the future. Web server application 222 will process the request from web browser 212 and, by examining the data stream received from web browser 212, recognize that the user needs to access software application 342. Web server application 222 will then communicate with Internet/application gateway 332 which resides on computer system 330 by using communication link 316. For the discussion herein, data flowing from web browser 212 to software application 342 is considered input data, while data flowing from software application 342 to web browser 212 is considered output data. Thus, data that web browser 212 outputs to web server application 222 is web browser input data (i.e., input data from web browser 212).

Internet/application gateway 332 is a gateway mechanism that acts as a translator/facilitator to allow the request from the user to be processed by software application 342. Typically, this will involve translating URLs, HTML codes, or other user-driven commands into a format or language that can be understood and processed by software application 342. Internet/application gateway 332 includes a plurality of APIs designed to facilitate the interaction between web browser 212 and software application 342. These APIs preferably include an OPEN API and a DISCONNECT API. In addition, the APIs can include SEND, RECEIVE and CLOSE API's.

The OPEN API starts a set of interactions between the software application 342 and the web browser 212. In particular, when the OPEN API is called it generates a conversation identifier that is used to tag the conversation between software application 342 and web browser 212. A conversation may include a number of different processes to accomplish a desired task. The conversation identifier is included in all communications (i.e., communications between software application 342 and Internet/application gateway 332, between web browser 212 and web server 222) to identify what conversation each individual communication belongs to.

The DISCONNECT API directs the Internet/application gateway 332 to suspend a running process until it is needed or able to restart the process. This is particularly useful where input is needed from the web client user to complete an already running process of software application 342. When the software application 342 requires such an input, a request must be sent back through the web server 222 to the web browser 212. For a variety of reasons it may be hours or even days before the input is sent back through the server 222 and to the software application 342, if the input is ever sent at all. The DISCONNECT API allows the software application to suspend the process until the input is received. In particular, the software application sends notice that it will suspend the process (identified by its conversation identifier) to the Internet/application gateway 332 by calling the DISCONNECT API. The DISCONNECT API directs the Internet/application gateway 332 to save the required information to restart the process that is being suspended. Thus, when the input is finally received, the Internet/application gateway 332 will recognize that this input is for a suspended process (by the associated conversation identifier) and will direct the software application to restart the suspended process and will deliver the input and required state information back to software application.

Thus, the DISCONNECT API allows long delays between software application 342 and web browser 212 communications that could otherwise result in unfinished software processes left waiting for action. The DISCONNECT API receives the conversation identifier and saves the required information such that the Internet/application gateway 332 can restart the process when needed.

The DISCONNECT API can also be used to suspend a software process when web server computer system 220, computer system 330 or computer system 340 fails or needs maintenance. For example, when web server computer system 220 needs to be brought down for maintenance the DISCONNECT API can be used the to suspend running process so they can be restarted after the web server 220 comes back up. In particular, the DISCONNECT API allows state changes to be preserved and the process restarted later if and when any of the computer systems fail and/or need to be brought down. This can greatly increase the reliability of overall system.

The CLOSE API is issued when all interactions between software application 342 and web browser 212 are complete for a particular transaction. The software application 342 calls the CLOSE API which tags the conversation as complete and purges unnecessary state data relating to the closed conversation.

The SEND API is issued to send data (in the form of HTML pages or other types) to web browser 212. The software application 342 calls the SEND API which transmits a send request and sends the data through the Internet/application gateway 332 and web server 222 to the appropriate web browser 212. The SEND API uses the conversation identifier to determine which web browser 212 to send the data to.

The RECEIVE API is issued to receive data from the web browser 212. This can include CGI data and environment data as needed. The software application 342 calls the RECEIVE API to direct Internet/application gateway 332 to wait for input. Once the input has arrived, Internet/application gateway 332 uses the conversation identifier to match the input data to the appropriate conversation and passes the data to software application 342 for processing.

Thus, the Internet/application gateway 332 uses the OPEN, DISCONNECT, CLOSE, SEND and RECEIVE APIs to facilitate communication between software application 342 and web browser 212.

Internet/application gateway 332 may provide a transparent web client interface for the user. This means that the user is unaware that they are interacting with software application 342 through Internet/application gateway 332. The interface of web browser 212 need not disclose the source of the data that is being displayed on client workstation 210. The actual processing and communicating being done by Internet/application gateway 332 may be completely hidden from the user of web browser 212. A transparent user interface can thus be implemented by embedding codes and instructions on the appropriate HTML web pages that appear on client workstation 210.

Alternatively, Internet/Application Gateway 332 may provide a nontransparent web client for certain users. These users would be aware that their request is being handled by a different or remote system over the WW. This may be the case for an in-house software user who has access to a software application that is running on a remote system.

After software application 342 has performed the task requested by the user via web browser 212, the appropriate status or data corresponding to the request is returned to Internet/application gateway 332 via connection 326. Internet/application gateway 332 transmits the requested data or status to web server application 222 using connection 316. Upon receipt, web server application 222 outputs the requested status or data into a form appropriate for web browser 212. Web browser 212 can then display the appropriate output for client workstation 210. This format would include, once again, any type of data that web browser 112 is capable of understanding (i.e., MIME, JAVA, HTML, etc.).

Figure 5:
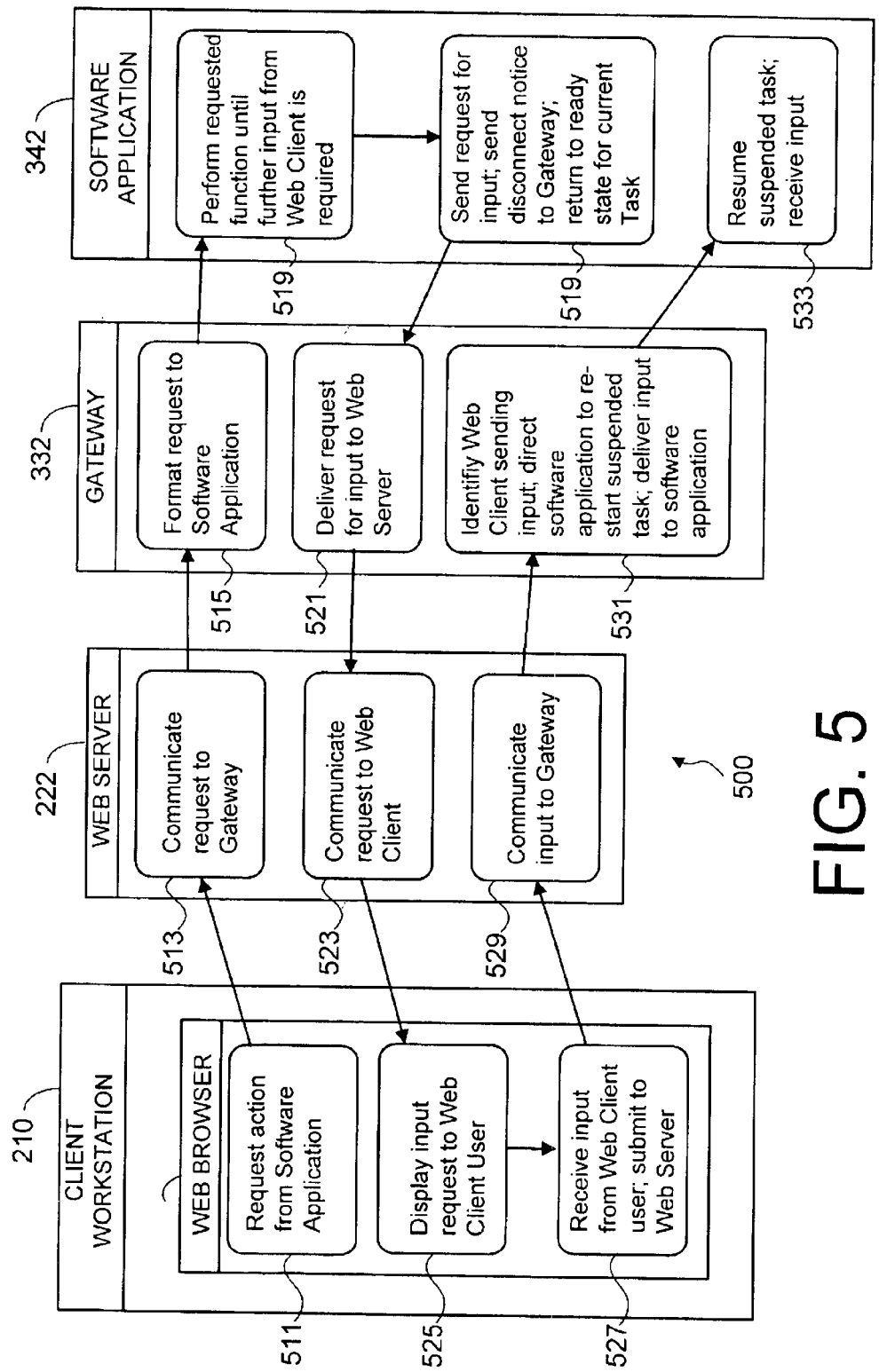
FIG. 5 is a process flow diagram for the system of FIG. 3.

Referring now to FIG. 5, a general method 500 of a preferred embodiment of the present invention to access software applications via the WWW may be described in conjunction with the system of FIG. 3. The method 500 assumes that a conversation has already been opened between client workstation 210 and software application 342 through the gateway 332. This would general involve authentication of the user using web server authentication measures. Additionally, by the software application 342 calling the OPEN API, a conversation identifier has been created to identify this conversation between the user of web browser 212 and software application 342. This conversation identifier is attached to all communications to tag the communication as belonging to this communication.

Now, a user at client workstation 210 performs an action that causes web browser 212 to request action to a software application via the WWW by inputting data to web server application 222 (step 511). Any input data is referred to herein as web browser input data, and may take the form of an HTML page, a URL, etc. Web browser 212 then uses standard communication protocols to pass web browser input data to web server application 222 for processing. Web server application 222 processes the request and recognizes that the user has requested access to software application 342. Web server application 222 communicates the request to the gateway (step 513). Any communication from web server application 222 to Internet/application gateway 332 is referred to herein as web server input data. Internet/application gateway 332 generates from the web server input data appropriate commands that the software application can understand and communicates the commands to software application 342 (step 515). This communication tells the software application 342 what process or function to perform and the conversation identifier that corresponds to these commands. Any communication from Internet/application gateway 332 to software application 342 is referred to herein as software application input data. Software application 342 then processes the request on software application input data and performs the necessary function(s) (step 517). These functions can include any processing needed for the software application 342 to perform its function. This processing is continued until further input is needed from the web client. For example, processing could be halted if the software application 342 needs input from the user to select an appropriate database to locate needed data. At this point, software application 342 sends the request for input to Internet/application gateway 332. Any communication from software application 342 to gateway 332 is referred to herein as software application output data. The software application 342 then calls a DISCONNECT API on Internet/application gateway 332 (step 519). The DISCONNECT API is a disconnect mechanism used to allow software application 342 to suspend a process while it waits for input. The DISCONNECT API causes Gateway 332 to save the necessary data and state information corresponding to the suspended conversation, including the conversation identifier. The software application 342 then suspends the current software process and returns to a state that will allow the software process to be restarted later.

Internet/application gateway 332 then communicates the request for input to the web server application 222 (step 521). Any communication from gateway 332 to web server application 222 is referred to herein as web server output data. Web server 222 then communicates a request for input to web browser 212 (step 523). The web browser 212 displays the received input request to the web client user (step 525).

The web client user will typically fulfill the request by entering the appropriate data into an HTML field. When the web client user hits the submit button, the entered data is submitted back to the web server 222 (step 527). Any communication between web server application 222 and web browser 212 is referred to herein as web browser output data.

Web server application 222 delivers the input data to Internet/application gateway 332 (step 529). Internet/application gateway 332 identifies the web client sending the input data, and recognizes that the data is for a process of software application 342 that has been suspended. This is preferably done by matching the conversation identifier included with the input to a database of conversations indexed by their conversation identifiers. Gateway 332 then directs the software application to restart the suspended process corresponding to the conversation identifier (step 531). Software application 342 can then re-start the suspended process where it left off and receive the input data. (step 533).

In the preferred embodiment, the step of calling the DISCONNECT API and suspending the software application 342 process is done each time an input is requested from the web browser 212. This limits the amount of computer resources that are required for the processes to wait for the input to return. The DISCONNECT API is also preferably used anytime computer systems 220, 330 or 340 need to temporarily shutdown for maintenance. This can be used to ensure reliability without undue disruption in running software processes.

Note that the connections shown in FIG. 5 are representative of different types of data flow, and do not represent physical connections. For example, web browser input data and web browser output data of FIG. 5 are both communicated via connection 216 of FIG. 3. Web server input data and web server output data are both communicated via connection 316 of FIG. 3. Software application input data and software application output data are both communicated via connection 326 of FIG. 3.

FIG. 5 depicts a preferred embodiment of a method in accordance with the present invention and describes the interaction and communication between a single web browser and a software application. However, the present invention is not limited to an environment with a single user and a single web browser. As explained below with regard to FIG. 7, a multi-user system is contemplated where multiple users will use multiple web browsers to simultaneously access the same software application via the WWW. The Internet/application gateway 332 provides a mechanism to track interactions between multiple users and match the requests made to the software application by each user for the various desired transactions.

Figure 4:
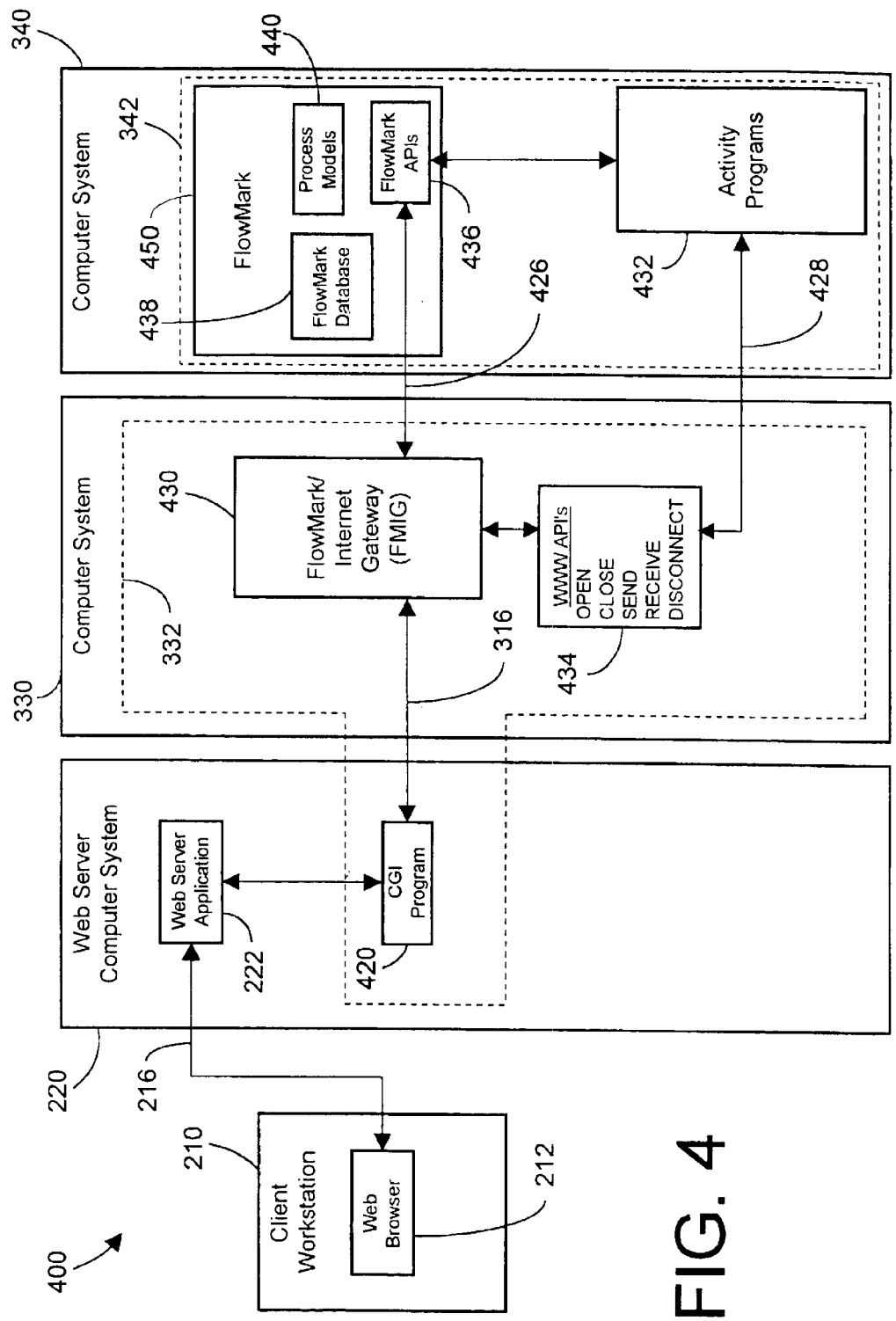
FIG. 4 is a more detailed block diagram of the system of FIG. 3, further adapted to access FlowMark workflow application software over the World-Wide Web.

Referring now to FIG. 4, a system 400 allows accessing a FlowMark workflow system over the WWW from web browser 212. In this example, software application 342 is a workflow application known as FlowMark which is programmed to perform a specific function. While this specific example uses FlowMark to describe the invention, the present invention is not limited to FlowMark. Other software applications may be used in conjunction with the present invention and it is anticipated that additional application software packages will be so used.

FlowMark is a popular process engineering tool that allows a relatively complex project or task to be broken down into a series of smaller processes or tasks. The activity to be executed by FlowMark is described by using one or more process models 440 that describe the process flow and activity. This makes FlowMark very useful for activities and transactions that can be accomplished by computer systems over communication networks. FlowMark is used to build process models 440 which describe the real life task as a series of computerized sequences. Information is processed by the FlowMark workflow software and usually involves multiple related activities. The FlowMark workflow process language models the activity and automates transactions where appropriate. Individual tasks are generated into "work lists" (i.e., electronic "to do" lists). One example of using FlowMark to accomplish a specific task will be presented in detail below.

System 400 of FIG. 4 represents one suitable detailed implementation of system 300 shown in FIG. 3. The same computer systems are present (i.e., 210, 220, 230, and 240), with web browser 212 and web server application 222 residing on client workstation 210 and web server computer system 220, respectively. In addition, connection 326 of FIG. 3 encompasses connections 426 and 428 of FIG. 4. System 400 of FIG. 4 is presented herein to show one specific implementation of Internet/application gateway 332 when used to communicate with FlowMark workflow software application 342.

For this specific implementation, Internet/application gateway 332 includes a Common Gateway Interface (CGI) program 420, a FlowMark/Internet Gateway (FMIG) 430 and WWW Application Program Interfaces (APIs) 434. The WWW API's 434 facilitate interaction between activity programs and web browser 212. The WWW API's 434 preferably include a OPEN, CLOSE, SEND, RECEIVE and DISCONNECT API.

FlowMark application software 342 includes FlowMark 450, and one or more activity programs 432. FlowMark 450 includes a database 438, one or more process models 440, and FlowMark APIs 436. A specific software application 342 is implemented in system 400 by defining a process model 440 within FlowMark, and by defining activity programs 432 that perform specific tasks within process model 440. FlowMark Application Program Interfaces (APIs) 436 are standard APIs that are supplied with FlowMark 450 and provide a way for FlowMark 450 to communicate with activity programs 432 and FMIG 430. FlowMark database 438 is a general purpose database that may be used to store information relating to any process model. For example, if a process model 440 and activity programs 432 implement a rental car workflow process, FlowMark database 438 would be used to store information relating to the rental car process, such as which cars are available, etc.

The user who needs to access a FlowMark application 342 over the WWW will input a request to web browser 212 using client workstation 210. The user can enter a URL for a specific home page site or click on a button presented in an HTML-generated user interface using web browser 212. When the user "submits" the requested information, usually by clicking on a button presented on an HTML form, web server application 222 receives input data from web browser 212. This data stream may be presented to web server application 222 in one of many different data stream formats that common web browsers understand. For example, RFC 1866 or RFC 1867 are two acceptable formats that common web browsers understand. The present invention is not limited to these formats but includes any data transmission format now known or developed in the future.

Web server application 222 will examine the user's data stream to determine what action should be taken to fulfill the user's request. If the user-requested information requires access to FlowMark application 342, there will be a command embedded in the data stream generated from web browser 212 that identifies the need to access FlowMark application 342. For this specific example, the command is a call to CGI program 420. The call to CGI program 420 may be part of the URL or, alternatively, may be embedded in the data submitted by web browser 212. Access to CGI program 420 is protected to keep unauthorized users from accessing FlowMark application 342 via the WWW. In order to gain access to CGI program 420, the user must be authenticated by web server application 222. When web server application 222 sees the CGI command in the data stream generated by web browser 212, it requests a password and user identification (userID) from the user via web browser application 222. After the user has been authenticated, web browser application 222 passes control to CGI program 420 to perform the needed operation(s).

CGIs are executable programs that are well known to those skilled in the art. CGIs function to provide a mechanism for transmitting information across the WWW. CGI program 420 passes information from web server application 222 to FMIG 430 in the form of commands. The commands are one-way, i.e., from CGI program 420 to FMIG 430, but data and status pass in both directions. Web server application 222 invokes CGI program 420, and sends the appropriate commands and data regarding the request. Although the current preferred embodiment of the invention uses the "CGI format" (post data) for data transmission from web browser 212 to CGI program 420, any other data transmission formats that may be generated by web browser 212 are contemplated and are within the scope of this invention.

After receiving the data from web browser 212, CGI program 420 parses the data to locate relevant information about the requested processes, including the request for access to FlowMark 342. CGI program 420 then sends the user data and requests to FMIG 430 along with some control information. FMIG 430 provides a gateway mechanism for FlowMark application 342 to interact with a web user over the WWW. FMIG 430 directs the flow of information between CGI program 420 and FlowMark application 342 and initiates FlowMark functions by using FlowMark APIs 436. For example, FMIG 430 may invoke a FlowMark API 436 to create a process instance necessary to process the request submitted by the user. Then, using a different FlowMark API 436, FMIG 430 can invoke or start this process instance. The process is governed by a process model 440, which tells FlowMark 450 which activity program 432 must be invoked to perform the desired task. Once FMIG 430 has started a FlowMark process, it waits until it receives and OPEN request from activity programs 432 via WWW APIs 434 that the request has been processed. The command interface between FMIG 430 and FlowMark APIs 436 is one-way, i.e., FMIG 430 always invokes FlowMark APIs 436, but the data and status information flows in both directions. This is important because it allows the interface to FlowMark application 342 to remain unchanged even if the web interface is changed.

Activity programs 432 are software modules which can be used by FlowMark to accomplish the tasks requested by the user. Individual activity programs 432 are initiated by Flow-Mark. Each workflow process model 440 initiates the activity programs 432 necessary to accomplish the designated task. Each activity program 432 is an instance of a program that runs to accomplish the desired task, returns the requested information, and then terminates.

When the FlowMark 450 invokes an activity program 432 that is to be accessed by web browser 212 the activity program 432 calls the OPEN API, one of the WWW API's 434. The OPEN API us generally used to open a conversation between FlowMark and web browser 212. The OPEN API assigns a "conversation identifier" to the requests from each web client that require interaction with the FlowMark activity program 432. This conversation identifier uniquely marks or tags all interactions between a specific web browser and FlowMark for a specific transaction of "conversation." FMIG 430 uses the conversation identifier to keep track of individual requests because FMIG 430 may be working with multiple users and multiple requests from each of those users. Other WWW API's 434, such as SEND and RECEIVE are used to facilitate communication to the web browser 212. FMIG 430 thus maintains the information necessary to control the flow of information between the various users and the process instances being processed by FlowMark. After completion of the activity program process, the conversation is generally closed by invoking a CLOSE API, another WWW API 434.

For example, activity programs 432 may require information from the user in order to process the user's request. Activity program 432 invokes a WWW RECEIVE API 434 to obtain the necessary data. In this case, FMIG 430 has data waiting to submit to activity program 432, which is the same data that CGI program 420 sent earlier in the process. FMIG 430 sends this data through WWW API 434 to activity programs 432 in response to the RECEIVE WWW API 434. Activity programs 432 take the appropriate steps to process the data and fill the request. Activity programs 432 communicate with the user through WWW APIs 434, FMIG 430, CGI program 420 and web server application 222. Return codes on the WWW API's 434 provide information confirming that the user has received the requested data. After confirmation has been received, that specific instance of activity programs 432 is finished with that request and will terminate. Other instances of one or more activity programs 432 may still be active, processing other requests.

Thus, WWW APIs 434 are invoked by activity programs 432 to provide interaction between FMIG 430 and activity programs 432. WWW APIs 434 allow FlowMark activity programs 432 to send and receive data and status to and from web clients. It is important to note the FlowMark APIs 436 remain unchanged. This is important because FlowMark APIs are not modified to allow a web user to access FlowMark. In this sense, FlowMark is unaware that a web client is accessing it, and FlowMark operates in the same manner it would as if a dedicated application were performing the requested functions. Since the FlowMark APIs are not affected, the operation of FlowMark will remain stable regardless of the process or task the web client is requesting that FlowMark application 342 accomplish. Multiple users from multiple locations can access FlowMark via the WWW and be assured that the FlowMark interface will remain stable. In some cases, the system will present a transparent web client, which means that there will be no indication to the user that their request is being processed by FlowMark application 342.

While not required, Computer System 230 and Computer System 240 are the same computer system in the preferred embodiment. Finally, connections 216, 316, and 326 may be any type of physical or logical means of connecting computer systems known in the art. This includes, but is not limited to, direct connections, Internet connections, Intranet connections, Infra Red (IR) and other forms of wireless connections. It is anticipated that many alternative methods and material for connecting computer systems will be readily adapted for use with the present invention. In sum, while several separate computer systems are disclosed herein (e.g., FIGS. 3 and 4), a computer system in accordance with the present invention may include any number or combination of computer systems. The figures herein are shown to illustrate salient aspects of the invention, and should not be construed to limit the invention to the particular configurations illustrated herein.

Figure 6:
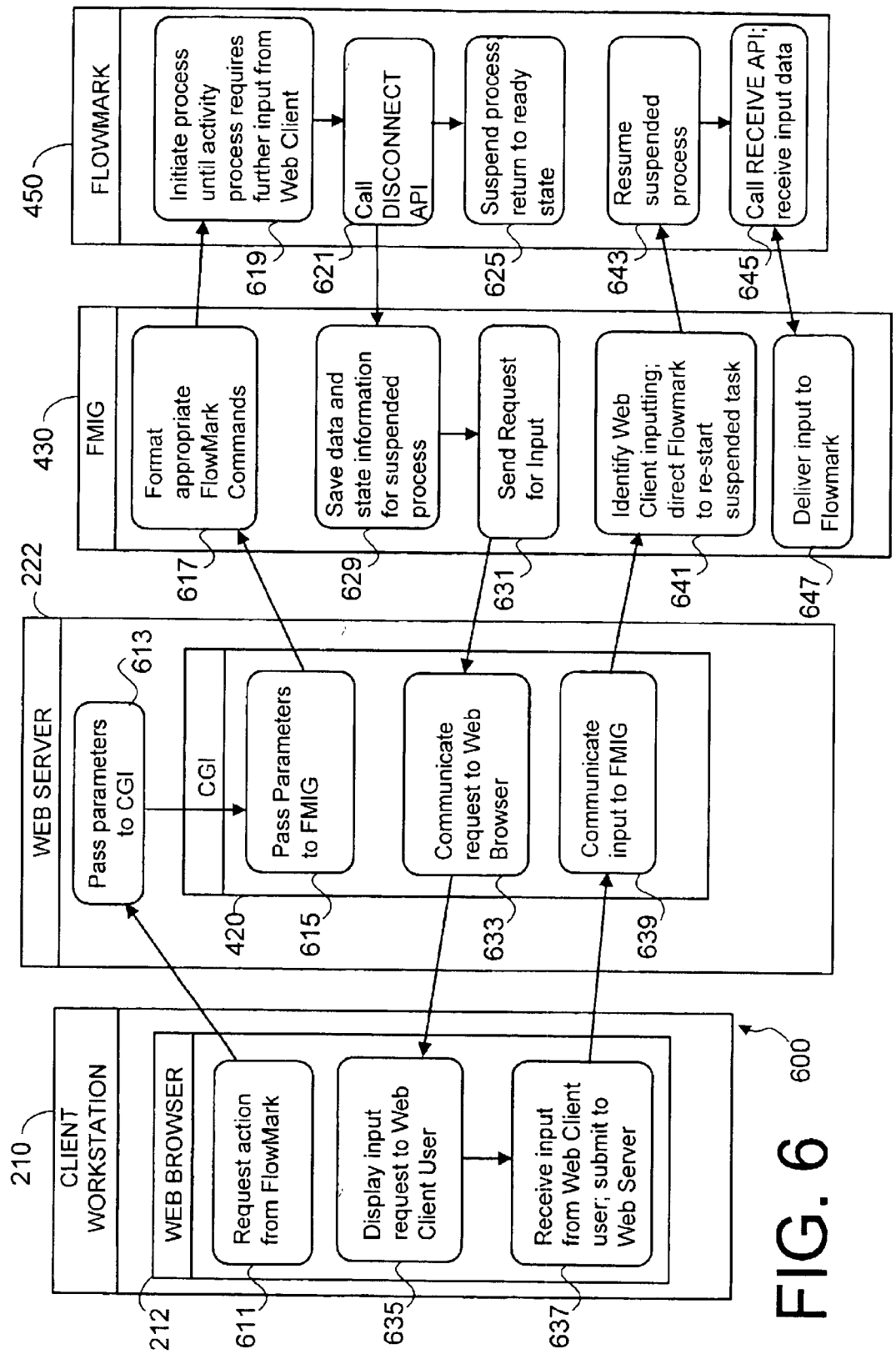
FIG. 6 is a process flow diagram for the system of FIG. 4.

Referring now to FIG. 6, a method 600 in accordance with a preferred embodiment of the present invention allows a user of web browser 212 to access a FlowMark application 342 with the system 400 of FIG. 4. Since the detailed steps of the method were discussed above in describing system 400 (FIG. 4), only an overview of the method steps will be presented here. A user at client workstation 210 takes some action via web browser 212 to initiate an access to Flow-Mark application 342 via the WWW (step 611). This action may involve submitting a URL address, clicking on a button of an HTML page displayed on the workstation, or some other activity. The user request and accompanying data is passed to web server application 222 by web browser 212. Web server application 222 receives the user request and data and passes appropriate parameters to CGI program 420 (step 613). The CGI then passes appropriate parameters to the FlowMark/Internet Gateway (FMIG) 430 (step 615). The FMIG formats FlowMark commands as necessary to accomplish the desired user task within FlowMark (step 617). This may included retrieving additional information, calculating requested data, etc. FlowMark application 342 will then initiate the processes request by FMIG 430 (step 619). This may include the initiation of one or more activity programs to accomplish the task or to provide the requested status or data. Activity program 434 then calls the OPEN API, one of the WWW API's 434. The OPEN API is used to open a conversation between FlowMark Activity programs 432 and web browser 212. The OPEN API assigns a "conversation identifier" to the requests from each web client that require interaction with the FlowMark activity program 432. This conversation identifier uniquely marks or tags all conversations between a specific web browser and FlowMark for a specific transaction or conversation.

The activity program process can continue to run until further input is needed from the web client user. When further input is needed, the running activity program 432 in FlowMark calls the DISCONNECT API, one of the WWW API's 434 (step 621). This tells the FMIG 430 that the running activity program will suspend the current process and return it to a ready state, capable of being manually re-started (step 625).

The DISCONNECT API generates a disconnect request message for FMIG 430 and includes information such as the conversation identifier, process instance, activity name and FlowMark userID. FMIG 430 takes this information and saves all of this information along with the "disconnect" status for activity program 432 in its internal cache (step 629). Additionally, FMIG 430 sends a return code to activity program 432. Activity program 432 checks the return code and verifies that the disconnect API was successfully recorded. Activity program 432 saves the conversation identifier and state data in a local database for restoring the disconnected process at a later time. The state data can include any data necessary to restart the activity program process and is preferably indexed with the conversation identifier. This puts the activity program process in a manual start mode. Thus, as far as FlowMark is concerned, this is a "manual start" activity. Since this activity is ready to manual start, FMIG 430 can issue a FlowMark API 436 at a later time to re-start the activity when the data is available from the web browser 212. This will allow FMIG 430 to restart the suspended process when a input having that conversation identifier is returned, irregardless of the delay before the input returns.

Additionally, by allowing the activity program process to suspend itself and save state, the server side computer system can be brought down for servicing and maintenance. This ability makes management of the system easier and can greatly improve the reliability of the system. Additionally, computer resources are freed up that would otherwise be used in keeping the activity program process running while waiting for input.

FMIG 430 then sends a request for input to CGI program 420 (step 631). After receiving the request for input, CGI program 420 sends the request for input to the web browser 212 (step 633). The web browser 212 displays the input request to the web client user (step 635). The user can fulfill the request for input in several ways, depending on the method used to send the request. For example, the user can press a HTML radio button to choose an input or the input can be manually typed into an HTML input form. The user then submits the input back to the CGI program 420 (step 637). The CGI program 420 parses the input data from the submission and delivers the input data to FMIG 430 (step 639). The FMIG 430 identifies the web client user that sent the input and the conversation the input belongs by the conversation identifier. This time, when FMIG 430 checks the conversation identifier, it will notice that the status of the activity is "disconnected." FMIG 430 issues FlowMark API 436 to re-start the activity program 432. Activity program 432 is thus re-started with FlowMark 450 creating a new process instance of activity program 432 and communicating via FlowMark API's 436 the state of the activity program that is being re-started.

Thus, FMIG 430 directs FlowMark to restart the suspended task, using the appropriate FlowMark API's 436 (step 641). Having received the request to restart, FlowMark restarts the suspended process (step 643).

Next, the running activity program in FlowMark calls the RECEIVE API, one of the WWW API's 434 (step 645). The RECEIVE API is used to receive the input data from the FMIG 430. The RECEIVE API waits to receive data until it is sent by the FMIG 430 (step 647). This data can include STDIN data and/or environment data, depending on the request. Thus, with the received input data the running activity program can continue until circumstances require the DISCONNECT API to be issued again.

Note that most of the connections used in FIG. 6 are the same as those shown and discussed with reference to FIG. 5. Like method 500 of FIG. 5, method 600 of FIG. 6 includes various data inputs and outputs that were explained in reference to method 500. In addition, a CGI data input communicates data from web server application 222 to CGI program 420, and a CGI data output communicates data from CGI program 420 to web server application 222. Note that web server input data 522 and web server output data 562 are shown connected to CGI program 420, since CGIs are typically executed on web server computer system 220 in response to web server application 222 invoking them.

Figure 7:
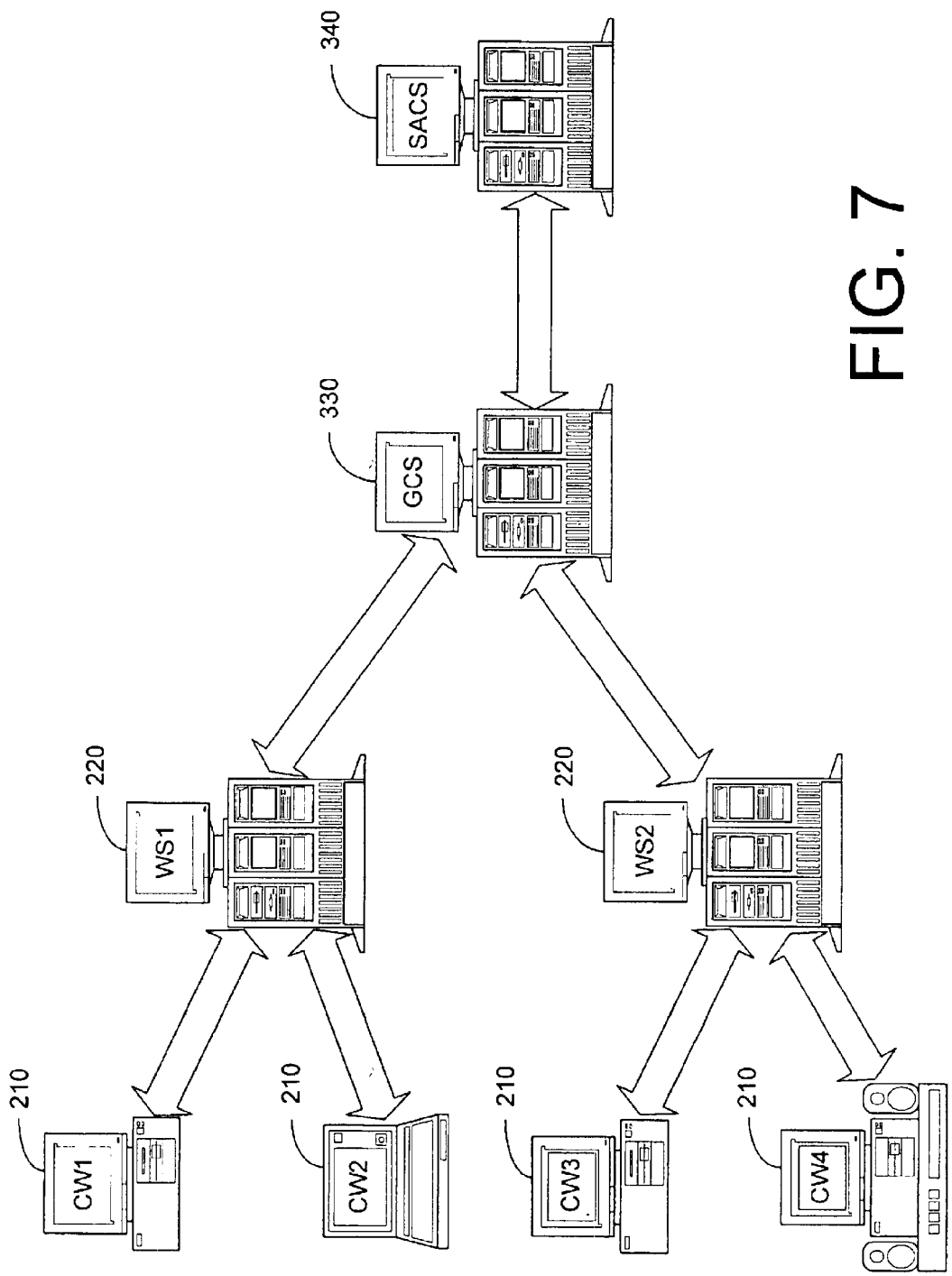
FIG. 7 is a block diagram of a preferred embodiment of the present invention when expanded to a multi-user environment.

Referring now to FIG. 7, advantages of the present invention become most apparent when multiple users are trying to access a single software application simultaneously via web browsers 212 on the WWW. Each web user will generally have a client workstation 210 that will be used to access the WWW. For the specific configuration of FIG. 7, client workstations 1 and 2 (CW1 and CW2) are coupled to web server 1 (WS1), and client workstations 3 and 4 (CW3 and CW4) are coupled to web server 2 (WS2). Both web servers WS1 and WS2 are coupled to a gateway computer system GCS. Gateway computer system is coupled to a software application computer system (SACS) that is running the software application that web users need to access via the WWW.

The present invention manages all the accesses by all these client workstations (CW1–CW4) to application software running on SACS in a manner that assures that the requested functions are performed as requested. The gateway computer system provides the application gateway that directs traffic between the web clients and the software application. By assigning unique identifiers to each conversation between a web client and the application software, the gateway computer system can interact with the software application using its native interface, and can then identify output from the software application and match it with the web client that started the process that resulted in the output being generated.

Thus, the preferred embodiment of the present invention provides a mechanism for facilitating communication between a web browser and a software application. The disclosed mechanism is particularly advantages where running processes need to be suspended and restarted, such as for the case where an input needs to be requested from the web browser and an undetermined amount of time may pass before the input is received back the software application.

While the invention has been particularly shown and described with reference to preferred embodiments thereof, it will be understood by those skilled in the art that various changes in form and details may be made therein without departing from the spirit and scope of the invention.

What is claimed is:

1. A computer system for communicating between a plurality of web browsers and a software application, said computer system comprising:
   at least one Central Processing Unit (CPU);
   a memory coupled to said CPU;
   a disconnect mechanism, said disconnect mechanism residing in said memory and being executed by said CPU, said disconnect mechanism being used by said software application to facilitate a request for input from one of said plurality of web browsers such that said software application need not wait for said input.

2. The computer system of claim 1 wherein said disconnect mechanism stores state data and a conversation identifier relating to each conversation between one of the plurality of web browsers and the software application when said software application process is suspended such that said state data can be retrieved when said software application process is resumed.

3. The computer system of claim 1 further comprising a web server application in communication with at least one of the plurality of web browsers, the web server application residing in said memory and being executed by said at least one CPU.

4. The computer system of claim 3 further comprising an application gateway in communication with the web server application and the software application, the application gateway residing in the memory and being executed by said at least one CPU, the application gateway including said disconnect mechanism and further comprising:

an identifier mechanism, said identifier mechanism generating a conversation identifier for each conversation between one of said plurality of web browsers and said software application.

5. The computer system of claim 1 wherein the software application is a process engineering software application.

6. The computer system of claim 1 wherein the software application is a workflow management software application.

7. The computer system of claim 1 wherein the disconnect mechanism comprises a disconnect application program interface (API) in communication with at least one running process of said software application.

8. The computer system of claim 7 wherein said at least one running process comprises at least one activity program that executes under the direction of the software application, the disconnect API communicating between the at least one activity program and the application gateway.

9. The computer system of claim 8 wherein said disconnect API is called by the at least one activity program.

10. The computer system of claim 1 wherein the web browser is executed on a client workstation by said at least one CPU.

11. The computer system of claim 4 wherein the web server application is executed on a web server computer by said at least one CPU.

12. The computer system of claim 11 wherein the application gateway is executed on the web server computer by said at least one CPU.

13. The computer system of claim 4 wherein the application gateway is executed on a first computer by said at least one CPU.

14. The computer system of claim 4 wherein the software application is executed on a second computer having at least one CPU.

15. The computer system of claim 14 wherein the application gateway is executed on the second computer by said at least one CPU.

16. The computer system of claim 14 wherein the application gateway is executed on a first computer by said at least one CPU.

17. A program product for communicating between a plurality of web browsers and a software application, said program product comprising:

signal bearing media;

a disconnect mechanism stored on said signal bearing media, said disconnect mechanism being used by said software application to facilitate a request for input from one of said plurality of web browsers such that said software application need not wait for said input.

18. The program product of claim 17 wherein said disconnect mechanism stores state data and a conversation identifier relating to each conversation between one of the plurality of web browsers and the software application when said software application process is suspended such that said state data can be retrieved when said software application process is resumed.

19. The program product of claim 17 further comprising a web server application in communication with at least one of the plurality of web browsers, the web server application residing in said memory and being executed by said at least one CPU.

20. The program product of claim 19 further comprising an application gateway in communication with the web server application and the software application, the application gateway residing in the memory and being executed by said at least one CPU, the application gateway including said disconnect mechanism and further comprising:

an identifier mechanism, said identifier mechanism generating a conversation identifier for each conversation between one of said plurality of web browsers and said software application.

21. The program product of claim 17 wherein the software application is a process engineering software application.

22. The program product of claim 17 wherein the software application is a workflow management software application.

23. The program product of claim 17 wherein the disconnect mechanism comprises a disconnect application program interface (API) in communication with at least one running process of said software application.

24. The program product of claim 23 wherein said at least one running process comprises at least one activity program that executes under the direction of the software application, the disconnect API communicating between the at least one activity program and the application gateway.

25. The program product of claim 24 wherein said disconnect API is called by the at least one activity program.

26. The program product of claim 17 wherein the web browser is executed on a client workstation by said at least one CPU.

27. The program product of claim 20 wherein the web server application is executed on a web server computer by said at least one CPU.

28. The program product of claim 27 wherein the application gateway is executed on the web server computer by said at least one CPU.

29. The program product of claim 20 wherein the application gateway is executed on a first computer by said at least one CPU.

30. The program product of claim 20 wherein the software application is executed on a second computer having at least one CPU.

31. The program product of claim 30 wherein the application gateway is executed on the second computer by said at least one CPU.

32. The program product of claim 30 wherein the application gateway is executed on a first computer by said at least one CPU.

33. A computer-implemented method for communicating between at least one web browser and a software application, the method comprising the steps within said software application of:

receiving a request from said at least one web browser;

initiating processing based on said request;

determining that input from said at least one web browser is required;

issuing a request for said input; and disconnecting from said web browser to facilitate said request for input such that said software application need not wait for said input.

34. The computer-implemented method of claim 33 wherein said disconnecting step is performed via interaction with a disconnect mechanism.

* * * * *